United States Patent
Jiang et al.

(10) Patent No.: US 11,930,080 B1
(45) Date of Patent: Mar. 12, 2024

(54) VEHICLE-MOUNTED HETEROGENEOUS NETWORK COLLABORATIVE TASK UNLOADING METHOD AND SYSTEM BASED ON SMART LAMP POSTS

(71) Applicant: HUNAN UNIVERSITY, Changsha (CN)

(72) Inventors: Hongbo Jiang, Changsha (CN); Zhu Xiao, Changsha (CN); Kehua Yang, Changsha (CN); Daibo Liu, Changsha (CN)

(73) Assignee: HUNAN UNIVERSITY, Changsha (CN)

( * ) Notice: Subject to any disclaimer, the term of this patent is extended or adjusted under 35 U.S.C. 154(b) by 0 days.

(21) Appl. No.: 18/486,693

(22) Filed: Oct. 13, 2023

(30) Foreign Application Priority Data

Apr. 28, 2023 (CN) .......................... 202310472858.7

(51) Int. Cl.
*H04L 67/12* (2022.01)
*H04L 67/568* (2022.01)

(52) U.S. Cl.
CPC ............ *H04L 67/12* (2013.01); *H04L 67/568* (2022.05)

(58) Field of Classification Search
CPC .............................. H04L 67/12; H04L 67/568
USPC ......................................................... 709/213
See application file for complete search history.

(56) References Cited

U.S. PATENT DOCUMENTS

| | | | | |
|---|---|---|---|---|
| 10,854,985 | B2* | 12/2020 | Achour | H01Q 21/065 |
| 11,026,072 | B2* | 6/2021 | Shen | H04W 28/22 |
| 11,133,879 | B2* | 9/2021 | Zhao | H04W 24/06 |
| 11,593,150 | B2* | 2/2023 | Sodagar | H04L 65/80 |
| 11,614,962 | B2* | 3/2023 | Liu | G06F 9/5038 |
| | | | | 718/102 |
| 11,627,444 | B2* | 4/2023 | Ruan | H04W 36/0033 |
| | | | | 370/252 |
| 11,638,133 | B1* | 4/2023 | O'Grady | H04L 67/12 |
| | | | | 709/217 |
| 11,641,644 | B2* | 5/2023 | Badic | H04W 40/24 |
| | | | | 370/329 |
| 11,657,591 | B2* | 5/2023 | Muehlenstaedt | G06V 10/764 |
| | | | | 382/104 |
| 11,743,808 | B2* | 8/2023 | Kim | H04W 76/38 |
| | | | | 370/329 |
| 11,751,123 | B2* | 9/2023 | Breaux, III | H04W 48/04 |
| | | | | 381/86 |
| 11,800,621 | B2* | 10/2023 | Shao | H05B 47/125 |
| 11,831,708 | B2* | 11/2023 | Li | H04L 67/10 |
| 11,843,990 | B2* | 12/2023 | Skaaksrud | G06Q 10/083 |
| 2019/0141142 | A1* | 5/2019 | Filippou | H04W 4/40 |
| 2023/0047503 | A1* | 2/2023 | Kim | H04L 67/51 |
| 2023/0074288 | A1* | 3/2023 | Filippou | H04W 28/0236 |
| 2023/0110467 | A1* | 4/2023 | Jha | G08G 1/096791 |
| | | | | 701/24 |
| 2023/0123322 | A1* | 4/2023 | Cella | G05B 23/0283 |
| | | | | 700/29 |
| 2023/0137879 | A1* | 5/2023 | Alam | G06F 9/5038 |
| | | | | 709/218 |
| 2023/0153174 | A1* | 5/2023 | Thyagaturu | G06F 9/5083 |
| | | | | 718/105 |
| 2023/0156262 | A1* | 5/2023 | Zhu | H04N 21/4331 |
| | | | | 725/75 |
| 2023/0221999 | A1* | 7/2023 | Heyl | G06F 9/5044 |
| | | | | 718/100 |
| 2023/0222531 | A1* | 7/2023 | Cella | G06Q 10/06315 |
| | | | | 705/7.31 |
| 2023/0284178 | A1* | 9/2023 | Parker | H04W 64/006 |
| | | | | 455/456.1 |
| 2023/0300579 | A1* | 9/2023 | Merwaday | G06Q 20/145 |
| | | | | 701/423 |
| 2023/0318932 | A1* | 10/2023 | Ferzli | G06N 3/098 |
| | | | | 709/220 |
| 2023/0362129 | A1* | 11/2023 | Hall | H04L 61/58 |
| 2023/0362683 | A1* | 11/2023 | Sabella | H04W 4/50 |
| 2023/0370416 | A1* | 11/2023 | Sabella | H04L 61/5007 |

FOREIGN PATENT DOCUMENTS

| | | | | |
|---|---|---|---|---|
| CN | 111355779 | A | | 6/2020 |
| CN | 111953759 | A | | 11/2020 |
| CN | 112379999 | A | | 2/2021 |
| CN | 113542351 | B | * | 11/2022 |
| CN | 111107566 | B | * | 9/2023 | ............. H04L 67/12 |

* cited by examiner

*Primary Examiner* — Melvin H Pollack
(74) *Attorney, Agent, or Firm* — Nitin Kaushik

(57) ABSTRACT

The present application discloses a vehicle-mounted heterogeneous network collaborative task unloading method, which comprises the following steps: calculating a communication delay when a vehicle requests a cache from a smart lamp post for a vehicle terminal; taking the maximum communication delay in all the caches as the communication delay between the vehicle and the smart lamp post network, and determining whether the communication delay is less than the time when the vehicle sends a request to a cloud center, if so, unloading a task to the smart lamp post network, otherwise, unloading a task to the cloud center; taking profit of a single smart lamp post itself as an index for the smart lamp post terminal, dividing the smart lamp post network into a plurality of coalitions, taking the profit maximization of the coalition as an optimization objective, optimizing a smart lamp post combination in the coalition.

6 Claims, No Drawings

VEHICLE-MOUNTED HETEROGENEOUS NETWORK COLLABORATIVE TASK UNLOADING METHOD AND SYSTEM BASED ON SMART LAMP POSTS

CROSS-REFERENCE TO RELATED APPLICATIONS

The application claims priority to Chinese patent application No. 2023104728587, filed on Apr. 28, 2023, the entire contents of which are incorporated herein by reference.

TECHNICAL FIELD

The present application relates to the technical field of mobile edge computing, and in particular, to a vehicle-mounted heterogeneous network collaborative task unloading method and system based on smart lamp posts.

BACKGROUND

As a new 5G network architecture and key technology, mobile edge computing migrates cloud computing resources to an edge server near the user, and the user only needs to offload tasks to the edge server for processing. Edge servers have better flexibility and lower latency than cloud servers. As a new type of multi-functional mobile edge equipment, smart lamp post has been widely popular in urban streets, which can provide services for the task unloading of vehicles.

The computing power and cache space of the edge server on the smart lamp post are limited, and the unloading of the edge computing tasks in the ultra-dense network will cause mutual interference and increase the transmission delay. Therefore, how to make an effective unloading decision to improve the service experience of the vehicle terminal and the overall benefit of the smart lamp post network is to be solved.

Therefore, it is necessary to provide a vehicle-mounted heterogeneous network collaborative task unloading method and system based on smart lamp posts to solve the above-mentioned problems.

SUMMARY

An object of the present application is to provide a vehicle-mounted heterogeneous network collaborative task unloading method and system based on smart lamp posts. The method comprises selecting a task unloading with a smaller delay for a vehicle terminal by comparing a time delay of initiating a request to the smart lamp post network and a cloud center; taking profit of the smart lamp post itself as an index according to the smart network terminal, dividing the smart lamp post network into a plurality of coalitions, taking the profit maximization of the coalitions as the optimization objective, optimizing the smart lamp post combination in the coalitions, and outputting an optimal coalition combination to improve the service experience on the vehicle terminal and the overall benefit of smart lamp post network.

In order to solve the above technical problem, the present application is implemented as follows:

a vehicle-mounted heterogeneous network collaborative task unloading method based on smart lamp posts, which comprises the following steps:

S1: acquiring coordinates of vehicles required for task unloading in a street and a cache required for the task unloading;

S2: acquiring coordinates of smart lamp posts in the street, and preloading caches required for unloading a vehicle task at random for each of the smart lamp posts;

S3: calculating a communication delay $D_{ijk_n}[t]$ when the vehicle i requests a cache j from a smart lamp post $k_n$; $D_{ijk_n}[t]=D^i(t)+D^q[t]$, in the formula $D^i(t)$ is a communication time of the cache j and $D^q[t]$ is a queuing delay of the cache j; traversing all the caches required for unloading a vehicle i task, taking the maximum communication delay in all the caches as the communication delay between the vehicle i and the smart lamp post network, and determining whether the communication delay between the vehicle i and the smart lamp post network is less than the time for the vehicle i to send a request to the cloud center, if so, the vehicle i unloads the task to the smart lamp post network, otherwise, unloads the task to the cloud center;

S4: taking profit of a single smart lamp post itself as an index for the smart lamp post terminal, dividing the smart lamp post network into a plurality of coalitions, taking the profit maximization of the coalition as an optimization objective, optimizing a smart lamp post combination in the coalition, and outputting an optimal coalition combination; wherein the step S4 specifically comprises the following steps:

S41: taking the profit of the single smart lamp post itself as the index, and dividing the smart lamp post network into a plurality of coalitions;

S42: assuming that the smart lamp post k joins a coalition S, calculating the profit of the smart lamp post k after joining the coalition S, wherein the calculation process is expressed as:

$$V(S)=H_k-R_k-W_k;$$

in the formula, V(S) represents profit of a smart lamp post k after the smart lamp post k joins the coalition S; $H_k$ represents income available to the smart lamp post k; $R_k$ represents costs required for the smart lamp post k to load a cache; $W_k$ represents communication costs generated when the smart lamp post cooperates with other smart lamp posts; wherein:

$H_k=\Sigma_{i \in M}h_j/D_{ijk_n}[t]$, wherein K represents a total number of vehicles in the street; $h_1$ represents income that can be obtained by the cache j in the smart lamp post k;

$R_k=\Sigma_{j \in k}r_j$, in the formula, $r_j$ represents costs required for the smart lamp post k to load the cache j;

$W_k=D^j(t)*w$, in the formula, w represents a communication cost weight;

S43: if the profit of the smart lamp post k after joining the coalition S is greater than 0, the smart lamp post k can join the coalition S, otherwise, the smart lamp post k cannot join the coalition S;

S44: constructing an optimization model, taking the profit maximization of the coalition as an optimization objective, optimizing the members of the smart lamp posts in the coalition, and outputting an optimal coalition combination, wherein the optimization model is expressed as:

$$MaxsizeV(S) = \sum_{k \in S} H_k - R_k - W_k.$$

Preferably, the cache required for unloading the vehicle task includes a kind of the cache and a space required for the cache.

Preferably, the cache required for unloading a vehicle task comprises the kind of cache and the space required for cache.

Preferably, the step S3 specifically comprises the following steps:

S31: calculating a communication delay $D_{ijk_n}[t]$ of a vehicle i from a smart lamp post $k_n$ request to a cache j, wherein the calculation process is expressed as $D_{ijk_n}[t]=D^i(t)+D^q[t]$: in the formula, $D^i(t)$ is a communication time of the cache j and $D^q[t]$ is a queuing delay of the cache j;

wherein, $D^i(t)=a(d_{ik_1}[t]+d_{k_1k_2}[t]+ \ldots +d_{k_{n-1}k_n}[t])$, in the formula, $D_{ik_1}[t]$ represents a distance between the vehicle i and the nearest smart lamp post $k_1$, $d_{k_1k_2}$ represents a distance between the smart lamp post $k_1$ and an adjacent smart lamp post $k_2$, and $d_{k_{n-1}k_n}$ represents a distance between the smart lamp post $k_{n-1}$ and a smart lamp post $k_n$ having the cache j; and a represents a communication constant, and is preset according to a channel condition;

wherein, $$D^q[t] = g_j(t) \frac{1}{E_{k_n} - \sum_{j \in N} r_j(t)},$$

in the formula, $g_j(t)$ is a communication weight of the cache j and $E_{k_n}$ is the maximum number of vehicles that can be served by the smart lamp post $k_n$; N is the total type of cache; and $r_j(t)$ is a number of vehicles served by the cache j on the smart lamp post $k_n$ at time t;

S32: traversing all the caches required for unloading a vehicle i task, taking the maximum communication delay in all the caches as the communication delay of the vehicle i, and taking the maximum communication delay in all the caches as the communication delay between the vehicle i and the smart lamp post network, and determining whether the communication delay between the vehicle i and the smart lamp post network is less than the time when the vehicle i sends a request to the cloud center, if so, the vehicle i unloads the task to the smart lamp post, otherwise, unloads the task to the cloud center; and S33: dynamically adjusting a cache configuration of the smart lamp post within the communication range of each vehicle, and when the communication delay $D_{ijk_n}[t]$ of the cache j is greater than the time requested from the cloud center, unloading the cache j on the smart lamp post, and reloading one of the cache groups requested from the cloud center by the vehicle.

Preferably, the step S4 further comprises the steps of:

S45: dynamically adjusting a cache configuration of the smart lamp post within the communication range of each vehicle, and when a time interval of the request of the cache j is greater than the time requested from the cloud center, unloading the cache, and reloading one of the cache groups requested from the cloud center by the vehicle.

The present application also provides a vehicle-mounted heterogeneous network collaborative task unloading system based on smart lamp posts, which comprises:

a first information collection module configured to acquire coordinates of vehicles required for task unloading in a street and a cache required for the task unloading;

a second information collection module configured to acquire coordinates of vehicles required for task unloading in a street and preload caches required for unloading a vehicle task at random for each of the smart lamp posts; and a vehicle terminal configured to calculate a communication delay $D_{ijk_n}[t]$ when the vehicle i requests a cache j from a smart lamp post; $D_{ijk_n}[t]=D^j(t)+D^q[t]$, in the formula, $D^j(t)$ is a communication time of the cache j and $D^q[t]$ is a queuing delay of the cache j; traversing all the caches required for unloading a vehicle i task, taking the maximum communication delay in all the caches as the communication delay between the vehicle i and the smart lamp post network, and determining whether the communication delay between the vehicle i and the smart lamp post network is less than the time for the vehicle i to send a request to the cloud center, if so, the vehicle i unloads the task to the smart lamp post, otherwise, unloads the task to the cloud center;

a smart lamp pole terminal configured to take profit of a single smart lamp post itself as an index for the smart lamp post terminal, divide the smart lamp post network into a plurality of coalitions, take the profit maximization of the coalition as an optimization objective, optimize smart lamp post combination in the coalition, and output the optimal coalition combination, wherein the optimization process comprises the following steps:

S41: taking the profit of the single smart lamp post itself as the index, and dividing the smart lamp post network into a plurality of coalitions;

S42: assuming that the smart lamp post k joins a coalition, calculating the profit of the smart lamp post k after joining the coalition S, wherein the calculation process is expressed as:

$V(S)=H_k-R_k-W_k;$ in the formula, V(S) represents profit of a smart lamp post k after the smart lamp post k joins the coalition k; $H_k$ represents income available to the smart lamp post k; $R_k$ represents costs required for the smart lamp post k to load a cache; $W_k$ represents communication costs generated when the smart lamp post cooperates with other smart lamp posts; wherein:

$H_k=\Sigma_{i \in M} h_j/D_{ijk_n}[t]$, in the formula, M represents a total number of vehicles in the street; $h_j$ represents income that can be obtained by the cache j in the smart lamp post k;

$R_k=\Sigma_{j \in k} r_j$, in the formula, $r_j$ represents costs required for the smart lamp post k to load the cache j;

$W_k=D^j(t)*w$, in the formula, w represents a communication cost weight;

S43: if the profit of the smart lamp post k after joining the coalition S is greater than 0, the smart lamp post k can join the coalition S, otherwise, the smart lamp post k cannot join the coalition;

S44: constructing an optimization model, taking the profit maximization of the coalition as an optimization objective, optimizing the members of the smart lamp posts in the coalition, and outputting an optimal coalition combination, wherein the optimization model is expressed as:

$$MaxsizeV(S) = \sum_{k \in S} H_k - R_k - W_k.$$

The beneficial effects of the present application are:

An online task unloading algorithm by using the method of coalition games is provided. The algorithm takes into account the relative position of a vehicle and the cache demand as well as the cache loaded by the smart lamp post and its service quality, and dynamically adjusts the coalition formed by the smart lamp post. The cache loaded by the smart lamp post is adjusted, the cache requesting less is unloaded, and the load with the cache requesting busy is replaced. The present application uses the quality of service that can be provided by a lamp post as an incentive revenue to enable smart lamp posts to dynamically form a coalition, and at the same time, the cache configuration of a single lamp post is dynamically adjusted. Ensuring that each coalition formed maximizes the overall revenue gained by all smart lamp posts, thereby maximizing the overall quality of service for all vehicles.

DETAILED DESCRIPTION OF THE EMBODIMENTS

The technical solutions in the embodiments of the present application will be clearly and completely described below with reference to the embodiments of the present application, and it is obvious that the described embodiments are some, but not all, embodiments of the present application. Based on the embodiments in the present application, all other embodiments obtained by a person skilled in the art without involving any inventive effort are within the scope of protection of the present application.

The present invention provides a vehicle-mounted heterogeneous network collaborative task unloading method based on smart lamp posts, which comprises the following steps:

S1: acquiring coordinates of vehicles required for task unloading in a street and a cache required for the task unloading;

The cache required for unloading the vehicle task includes a kind of the cache and a space required for the cache;

S2: acquiring coordinates of smart lamp posts in the street, and preloading caches required for unloading a vehicle task at random for each of the smart lamp posts;

the number of caches required for task unloading may be multiple for each vehicle and may be different for different vehicles, so that the number of caches required to complete the task unloading requirements of all vehicles in the street is large and cannot be fully loaded on the single smart lamp post. By using random loading method, all vehicles are provided with the cache required for task unloading by using the network composed of all smart lamp posts in the street, which can reduce the cache loading cost under the condition of meeting the task unloading requirements.

Further, in order to improve the utilization rate of preloaded caches on the smart lamp post, the cache required for unloading a vehicle task comprises a kind of the cache and a space required for the cache;

S3: calculating a communication delay $D_{ijk_n}[t]$ when the vehicle i requests a cache j from a smart lamp post $k_n$; $D_{ijk_n}[t]=D^i(t)+D^q[t]$, in the formula, $D^i(t)$ is a communication time of the cache j and $D^q[t]$ is a queuing delay of the cache j; traversing all the caches required for unloading a vehicle i task, taking the maximum communication delay in all the caches as the communication delay between the vehicle i and the smart lamp post network, and determining whether the communication delay between the vehicle i and the smart lamp post network is less than the time for the vehicle i to send a request to the cloud center, if so, the vehicle i unloads the task to the smart lamp post, otherwise, unloads the task to the cloud center;

the smart lamp post serves as an edge device for servicing the vehicle terminal. For the vehicle terminal, the core appeal is to shorten the time to cache requests and improve the efficiency of task unloading. Therefore, if the time for acquiring a cache from the smart lamp post network is less than the time for initiating a request to the cloud center, then unloading a task to the smart lamp post network; if the time for acquiring a cache from the smart lamp post network is not less than the time for initiating a request to the cloud center, unloading a task to the cloud center.

The step S3 specifically comprises the following steps:

S31: calculating a communication delay when the vehicle i requests a cache j from a smart lamp post $k_n$; and the calculation is expressed as $D_{ijk_n}[t]=D^i(t)+D^q[t]$, in the formula, $D^i(t)$ is a communication time of the cache j and $D^q[t]$ is a queuing delay of the cache j;

wherein, $D^i(t)=a(d_{ik_1}[t]+d_{k_1k_2}[t]+ \ldots +d_{k_{n-1}k_n}[t])$, in the formula, $D_{ik_1}[t]$ represents a distance between the vehicle i and the nearest smart lamp post $k_1$, $d_{k_1k_2}$ represents a distance between the smart lamp post $k_1$ and an adjacent smart lamp post $k_2$, and $d_{k_{n-1}k_n}$ represents a distance between the smart lamp post $k_{n-1}$ and a smart lamp post $k_n$ having the cache j; and a represents a communication constant, and is preset according to a channel condition. In the street, the coordinates of the vehicle and each smart lamp post are all known, and the distance between the lane and the smart lamp post and the distance between adjacent smart lamp posts can be obtained according to the corresponding coordinates;

wherein, $$D^q[t] = g_j(t) \frac{1}{E_{k_n} - \sum_{j \in N} r_j(t)},$$

in the formula, $g_j(t)$ is a communication weight of the cache j and n is the maximum number of vehicles that can be served by the smart lamp post $k_n$; N is the total type of cache; and $r_j(t)$ is a number of vehicles served by the cache j on the smart lamp post $k_n$ at time t.

the process of a vehicle i requesting a smart lamp post $k_n$ to a cache j is: the vehicle first initiates a request to the nearest smart lamp post $k_1$ within the communication range, and if the smart lamp post $k_1$ has a cache j, the request is completed; on the other hand, the request is sent to the surrounding smart lamp post through the smart lamp post $k_1$ until sent to the smart lamp post $k_n$, and the request is completed. According to the abovementioned process, the communication delay $D_{ijk_n}[t]$ requested to the cache j comprises two parts, wherein one part is a communication time of the cache j, and the communication time comprises a communication time of a vehicle i to a smart lamp post $k_1$ and a communication time sent from a smart lamp post $k_1$ to a smart lamp post $k_n$ one by one; another part is a queuing time of the cache j, and the cache j on the smart lamp post $k_n$ may need to serve multiple vehicles, therefore, an additional queue of waiting is required when a request is sent to the smart lamp post $k_n$;

specifically: the cache required for vehicle $i_1$ task unloading is $j_1$, $j_2$, and $j_3$, and the vehicle communication range includes three smart lamp posts $k_1$, $k_2$, and $k_3$. The cache loaded by the smart lamp post $k_1$ is $j_1$, $j_4$, and $j_5$, the cache loaded by the smart lamp post $k_2$ is $j_1$, $j_2$, and $j_4$, the cache loaded by the smart lamp post $k_3$ is $j_1$, $j_3$, and $j_5$, and the vehicle $i_1$ is closest to the smart lamp post $k_1$. Then the vehicle $i_1$ first initiates a request to the smart lamp post $k_1$, and can request a cache $j_1$, but cannot request caches $j_2$ and $j_3$ from the smart lamp post $k_1$; a communication is continuously initiated to the smart lamp post $k_2$ through the smart lamp post $k_1$, and a cache $j_2$ is requested from the smart lamp post $k_2$; the communication is continuously initiated to the smart lamp post $k_3$ through the smart lamp post $k_2$, a cache $j_3$ is requested from the smart lamp post $k_3$ to complete the request of all the caches;

S32: traversing all the caches required for unloading a vehicle i task, taking the maximum communication delay in all the caches as the communication delay of the vehicle i, and taking the maximum communication delay in all the caches as the communication delay between the vehicle i and the smart lamp post network, and determining whether the communication delay between the vehicle i and the smart lamp post network is less than the time when the vehicle i sends a request to the cloud center, if so, the vehicle i unloads the task to the smart lamp post, otherwise, unloads the task to the cloud center;

when a vehicle initiates a request to the smart lamp post network, multiple cached requests are performed at the same time, and therefore the communication delay between the vehicle i and the smart lamp post network is the maximum communication delay in all caches;

S33: dynamically adjusting a cache configuration of the smart lamp post within the communication range of each vehicle, and when the communication delay $D_{ijk_n}[t]$ of the cache j is greater than the time requested from the cloud center, unloading the cache j on the smart lamp post, and reloading one of the cache groups requested from the cloud center by the vehicle;

when the time for requesting a cache j is too long, the vehicle sends the request directly to a transportation center, which can shorten the request time, but at this time the cache will become a redundant cache j, and if it continues to be loaded on the smart lamp post, it will occupy the cache space on the smart lamp post, and affect the utilization rate of the cache on the smart lamp post; therefore, loading a new cache after unloading can reduce the dependence on the cloud center and improve the utilization rate of the cache on the smart lamp post, and the newly loaded cache is down to the smart lamp post from the cloud center, which shortens the communication distance and can shorten the request time;

S4: taking profit of a single smart lamp post itself as an index for the smart lamp post terminal, dividing the smart lamp post network into a plurality of coalitions, taking the profit maximization of the coalition as an optimization objective, optimizing a smart lamp post combination in the coalition, and outputting an optimal coalition combination; wherein the step S4 specifically comprises the following steps:

S41: taking the profit of the single smart lamp post itself as the index, and dividing the smart lamp post network into a plurality of coalitions;

S42: assuming that the smart lamp post joins a coalition S, calculating the profit of the smart lamp post k after joining the coalition S, wherein the calculation process is expressed as:

$$V(S) = H_k - R_k - W_k;$$

in the formula, V(S) represents profit of a smart lamp post k after the smart lamp post k joins the coalition S; $H_k$ represents income available to the smart lamp post k; $R_k$ represents costs required for the smart lamp post k to load a cache; $W_k$ represents communication costs generated when the smart lamp post k cooperates with other smart lamp posts; wherein:

$H_k = \Sigma_{i \in M} h_j / D_{ijk_n}[t]$, in the formula, M represents a total number of vehicles in the street; $h_j$ represents income that can be obtained by the cache j in the smart lamp post k;

$R_k = \Sigma_{j \in k} r_j$, in the formula, $r_j$ represents costs required for the smart lamp post k to load the cache j;

$W_k = D^j(t) * w$, in the formula, w represents a communication cost weight;

S43: if the profit of the smart lamp post k after joining the coalition S is greater than 0, the smart lamp post k can join the coalition S, otherwise, the smart lamp post k cannot join the coalition S;

S44: constructing an optimization model, taking the profit maximization of the coalition as an optimization objective, optimizing the members of the smart lamp posts in the coalition, and outputting an optimal coalition combination, wherein the optimization model is expressed as:

$$MaxsizeV(S) = \sum_{k \in S} H_k - R_k - W_k.$$

As for the smart lamp post terminal, it provides a cache to the vehicle terminal and charges a certain fee to the vehicle terminal, so the core appeal of the smart lamp post terminal is to maximize the profit.

The step S4 further comprises the following steps:

S45: dynamically adjusting a cache configuration of the smart lamp post within the communication range of each vehicle, and when a time interval of the request of the cache j is greater than the time requested from the cloud center, unloading the cache, and reloading one of the cache groups requested from the cloud center by the vehicle;

in the process of coalition optimization, the unceasing integration and breaking of coalition will eventually generate a coalition group with maximum profit. In the process of forming a coalition, since a single smart lamp post has a variety of caches and can serve multiple vehicles, and in addition, there may be some coalition-wide vehicles requesting too frequently. Therefore, it may occur that one smart lamp post needs to form a coalition A with the smart lamp post in a range of a, and another coalition B needs to cooperate with the smart lamp post in a range of b; for this case, the computing resources of the smart lamp post are divided according to needs, so that they exist in two coalitions simultaneously, and the resources occupied by the smart lamp post in a plurality of coalitions are accumulated to ensure that the computing resources of the smart lamp post do not overflow.

The present application also provides a vehicle-mounted heterogeneous network collaborative task unloading system based on smart lamp posts, which comprises:
- a first information collection module configured to acquire coordinates of vehicles required for task unloading in a street and a cache required for the task unloading;
- a second information collection module configured to acquire coordinates of vehicles required for task unloading in a street and preload caches required for unloading a vehicle task at random for each of the smart lamp posts; and
- a vehicle terminal: calculating a communication delay $D_{ijk_n}[t]$ when a vehicle i requests a cache from a smart lamp post $k_n$, $D_{ijk_n}[t]=D^i(t)+D^q[t]$, in the formula, $D^i(t)$ is a communication time of the cache j and $D^q[t]$ is a queuing delay of the cache j; traversing all the caches required for unloading a vehicle i task, taking the maximum communication delay in all the caches as the communication delay between the vehicle i and the smart lamp post network, and determining whether the communication delay between the vehicle i and the smart lamp post network is less than the time for the vehicle i to send a request to the cloud center, if so, the vehicle i unloads the task to the smart lamp post, otherwise, unloads the task to the cloud center;
- a smart lamp pole terminal configured to take profit of a single smart lamp post itself as an index for the smart lamp post terminal, divide the smart lamp post network into a plurality of coalitions, take the profit maximization of the coalition as an optimization objective, optimize smart lamp post combination in the coalition, and output the optimal coalition combination, wherein the optimization process comprises the following steps:
  S41: taking the profit of the single smart lamp post itself as the index, and dividing the smart lamp post network into a plurality of coalitions;
  S42: assuming that the smart lamp post k joins a coalition S, calculating the profit of the smart lamp post k after joining the coalition S, wherein the calculation process is expressed as:

$V(S)=H_k-R_k-W_k$;

in the formula, V(S) represents profit of a smart lamp post k after the smart lamp post k joins the coalition S; $H_k$ represents income available to the smart lamp post k; $R_k$ represents costs required for the smart lamp post k to load a cache; $W_k$ represents communication costs generated when the smart lamp post k cooperates with other smart lamp posts; wherein:
  $H_k=\Sigma_{i \in M} h_j/D_{ijk_n}[t]$, in the formula, M represents a total number of vehicles in the street; $h_j$ represents income that can be obtained by the cache j in the smart lamp post k;
  $R_k=\Sigma_{j \in k} r_j$, in the formula, $r_j$ represents costs required for the smart lamp post k to load the cache j;
  $W_k=D^j(t)*w$, in the formula, w represents a communication cost weight;
  S43: if the profit of the smart lamp post k after joining the coalition S is greater than 0, the smart lamp post k can join the coalition S, otherwise, the smart lamp post k cannot join the coalition S;
  S44: constructing an optimization model, taking the profit maximization of the coalition as an optimization objective, optimizing the members of the smart lamp posts in the coalition, and outputting an optimal coalition combination, wherein the optimization model is expressed as:

$$MaxsizeV(S) = \sum_{k \in S} H_k - R_k - W_k.$$

The embodiments of the present application have been described above, but the present application is not limited to the embodiments described above. However, the above-mentioned specific embodiments are merely illustrative and not restrictive, and a person skilled in the art, with the inspiration from the present application, would have been able to make many forms of the present application without departing from the spirit and scope of the present application according to the present application.

What is claimed is:

1. A vehicle-mounted heterogeneous network collaborative task unloading method based on smart lamp posts, comprising the following steps:
   S1: acquiring coordinates of vehicles required for task unloading in a street and a cache required for the task unloading;
   S2: acquiring coordinates of smart lamp posts in the street, and preloading caches required for unloading a vehicle task at random for each of the smart lamp posts;
   S3: calculating a communication delay $D_{ijk_n}[t]$ when the vehicle i requests a cache j from a smart lamp post $k_n$; $D_{ijk_n}[t]=D^i(t)+D^q[t]$, in the formula, $D^i(t)$ is a communication time of the cache j and $D^q[t]$ is a queuing delay of the cache j; traversing all the caches required for unloading a vehicle i task, taking the maximum communication delay in all the caches as the communication delay between the vehicle i and the smart lamp post network, and determining whether the communication delay between the vehicle i and the smart lamp post network is less than the time for the vehicle i to send a request to a cloud center, if so, the vehicle i unloads the task to the smart lamp post network, otherwise, unloads the task to the cloud center;
   S4: taking profit of a single smart lamp post itself as an index for the smart lamp post terminal, dividing the smart lamp post network into a plurality of coalitions, taking the profit maximization of the coalition as an optimization objective, optimizing a smart lamp post combination in the coalition, and outputting an optimal coalition combination; wherein the step S4 specifically comprises the following steps:
   S41: taking the profit of the single smart lamp post itself as the index, and dividing the smart lamp post network into a plurality of coalitions;
   S42: assuming that the smart lamp post k joins a coalition S, calculating the profit of the smart lamp post k after joining the coalition S, wherein the calculation process is expressed as: $V(S)=H_k-R_k-W_k$
   in the formula, V(S) represents profit of a smart lamp post k after the smart lamp post k joins the coalition; $H_k$ represents income available to the smart lamp post k; $R_k$ represents costs required for the smart lamp post k to load a cache; $W_k$ represents communication costs generated when the smart lamp post k cooperates with other smart lamp posts; wherein:

$H_k=\Sigma_{i\in M}h_j/D_{ijk_n}[t]$, in the formula, M represents a total number of vehicles in the street; $h_j$ represents income that can be obtained by the cache j in the smart lamp post k;

$R_k=\Sigma_{j\in k}r_j$, in the formula, $r_j$ represents costs required for the smart lamp post to load the cache j;

$W_k=D^j(t)*w$, in the formula, w represents a communication cost weight;

S43: if the profit of the smart lamp post k after joining the coalition S is greater than 0, the smart lamp post k can join the coalition S, otherwise, the smart lamp post k cannot join the coalition;

S44: constructing an optimization model, taking the profit maximization of the coalition as an optimization objective, optimizing the members of the smart lamp posts in the coalition, and outputting an optimal coalition combination, wherein the optimization model is expressed as:

$$MaxsizeV(S) = \sum_{k\in S} H_k - R_k - W_k.$$

2. The vehicle-mounted heterogeneous network collaborative task unloading method based on smart lamp posts according to claim 1, wherein the cache required for unloading a vehicle task comprises a kind of the cache and a space required for the cache.

3. The vehicle-mounted heterogeneous network collaborative task unloading method based on smart lamp posts according to claim 1, wherein the number of pre-loaded caches on each smart lamp post is equal to the maximum load of caches on each smart lamp post.

4. The vehicle-mounted heterogeneous network collaborative task unloading method based on smart lamp posts according to claim 1, wherein the step S3 specifically comprises the following steps:

S31: calculating a communication delay $D_{ijk_n}[t]$ of a vehicle i from a smart lamp post $k_n$ request to a cache j, wherein the calculation process is expressed as $D_{ijk_n}[t]=D^i(t)+D^q[t]$: in the formula, $D^i(t)$ is a communication time of the cache j and $D^q[t]$ is a queuing delay of the cache j;

wherein, $D^i(t)=a(d_{ik_1}[t]+d_{k_1k_2}[t]+ \ldots +d_{k_{n-1}k_n}[t])$, in the formula, $d_{ik_1}[t]$ represents a distance between the vehicle i and the nearest smart lamp post $k_1$, $d_{k_1k_2}$ represents a distance between the smart lamp post $k_1$ and an adjacent smart lamp post $k_2$, and $d_{k_{n-1}k_n}$ represents a distance between the smart lamp post $k_{n-1}$ and a smart lamp post $k_n$ having the cache j; and a represents a communication constant, and is preset according to a channel condition;

wherein, $$D^q[t] = g_j(t)\frac{1}{E_{k_n} - \sum_{j\in N} r_j(t)},$$

in the formula, $g_j(t)$ is a communication weight of the cache j and $E_{k_n}$ is the maximum number of vehicles that can be served by the smart lamp post $k_n$; N is the total type of cache; and $r_j(t)$ is a number of vehicles served by the cache j on the smart lamp post $k_n$ at time t;

S32: traversing all the caches required for unloading a vehicle i task, taking the maximum communication delay in all the caches as the communication delay of the vehicle i, and taking the maximum communication delay in all the caches as the communication delay between the vehicle i and the smart lamp post network, and determining whether the communication delay between the vehicle i and the smart lamp post network is less than the time when the vehicle i sends a request to the cloud center, if so, the vehicle i unloads the task to the smart lamp post, otherwise, unloads the task to the cloud center; and S33: dynamically adjusting a cache configuration of the smart lamp post within the communication range of each vehicle, and when the communication delay $D_{ijk_n}[t]$ of the cache j is greater than the time requested from the cloud center, unloading the cache j on the smart lamp post, and reloading one of the cache groups requested from the cloud center by the vehicle.

5. The vehicle-mounted heterogeneous network collaborative task unloading method based on smart lamp posts according to claim 4, wherein the step S4 further comprises the following steps:

S45: dynamically adjusting a cache configuration of the smart lamp post within the communication range of each vehicle, and when a time interval of the request of the cache j is greater than the time requested from the cloud center, unloading the cache, and reloading one of the cache groups requested from the cloud center by the vehicle.

6. A vehicle-mounted heterogeneous network collaborative task unloading system based on smart lamp posts, comprising:

a first information collection module configured to acquire coordinates of vehicles required for task unloading in a street and a cache required for the task unloading;

a second information collection module configured to acquire coordinates of vehicles required for task unloading in a street and preload caches required for unloading a vehicle task at random for each of the smart lamp posts; and a vehicle terminal configured to calculate a communication delay $D_{ijk_n}[t]$ when the vehicle i requests a cache j from a smart lamp post $k_n$;

$D_{ijk_n}[t]=D^i(t)+D^q[t]$, in the formula, $D^i(t)$ is a communication time of the cache j and $D^q[t]$ is a queuing delay of the cache j; traversing all the caches required for unloading a vehicle i task, taking the maximum communication delay in all the caches as the communication delay between the vehicle i and the smart lamp post network, and determining whether the communication delay between the vehicle i and the smart lamp post network is less than the time for the vehicle i to send a request to the cloud center, if so, the vehicle i unloads the task to the smart lamp post, otherwise, unloads the task to the cloud center;

a smart lamp pole terminal configured to take profit of a single smart lamp post itself as an index for the smart lamp post terminal, divide the smart lamp post network into a plurality of coalitions, take the profit maximization of the coalition as an optimization objective, optimize smart lamp post combination in the coalition, and output the optimal coalition combination, wherein the optimization process comprises the following steps:

S41: taking the profit of the single smart lamp post itself as the index, and dividing the smart lamp post network into a plurality of coalitions;

S42: assuming that the smart lamp post k joins a coalition S, calculating the profit of the smart lamp post k after joining the coalition, wherein the calculation process is expressed as:

$$V(S)=H_k-R_k-W_k;$$

in the formula, V(S) represents profit of a smart lamp post k after the smart lamp post k joins the coalition S; $H_k$ represents income available to the smart lamp post k; $R_k$ represents costs required for the smart lamp post k to load a cache; $W_k$ represents communication costs generated when the smart lamp post k cooperates with other smart lamp posts; wherein:

$H_k=\Sigma_{i\in M}h_j/D_{ijk_n}[t]$, in the formula, M represents a total number of vehicles in the street; $h_j$ represents income that can be obtained by the cache j in the smart lamp post k;

$R_k=\Sigma_{j\in k}r_j$, in the formula, $r_j$ represents costs required for the smart lamp post k to load the cache j;

$W_k=D^j(t)*w$, in the formula, w represents a communication cost weight;

S43: if the profit of the smart lamp post k after joining the coalition S is greater than 0, the smart lamp post k can join the coalition S, otherwise, the smart lamp post k cannot join the coalition S;

S44: constructing an optimization model, taking the profit maximization of the coalition as an optimization objective, optimizing the members of the smart lamp posts in the coalition, and outputting an optimal coalition combination, wherein the optimization model is expressed as:

$$MaxsizeV(S) = \sum_{k\in S}H_k - R_k - W_k.$$

* * * * *